(12) United States Patent
Aguirre-Valencia

(10) Patent No.: US 9,361,684 B2
(45) Date of Patent: Jun. 7, 2016

(54) FEATURE VALIDATION USING ORIENTATION DIFFERENCE VECTOR

(71) Applicant: EchoPixel, Inc., Los Altos Hills, CA (US)

(72) Inventor: Sergio Aguirre-Valencia, Santa Clara, CA (US)

(73) Assignee: EchoPixel, Inc., Los Altos Hills, CA (US)

( * ) Notice: Subject to any disclaimer, the term of this patent is extended or adjusted under 35 U.S.C. 154(b) by 0 days.

(21) Appl. No.: 13/999,381

(22) Filed: Feb. 18, 2014

(65) Prior Publication Data

US 2015/0235364 A1 Aug. 20, 2015

(51) Int. Cl.
*G06K 9/00* (2006.01)
*G06T 7/00* (2006.01)

(52) U.S. Cl.
CPC .......... *G06T 7/0014* (2013.01); *G06T 7/0028* (2013.01); *G06T 2207/10072* (2013.01); *G06T 2207/30032* (2013.01)

(58) Field of Classification Search
CPC .................................................. G06T 7/0014
USPC ....................................................... 382/131
See application file for complete search history.

(56) References Cited

U.S. PATENT DOCUMENTS

| | | | | |
|---|---|---|---|---|
| 6,066,095 A * | 5/2000 | Morsy | .............. | G06T 7/2033 600/438 |
| 6,850,646 B1 * | 2/2005 | Silver et al. | ............... | 382/199 |
| 8,837,834 B2 * | 9/2014 | Chouly | .............. | G06K 9/4633 382/170 |
| 2004/0228529 A1 * | 11/2004 | Jerebko et al. | ............ | 382/173 |
| 2010/0027861 A1 * | 2/2010 | Shekhar et al. | ............ | 382/131 |
| 2014/0236064 A1 * | 8/2014 | Binmoeller et al. | ........ | 604/8 |
| 2015/0094574 A1 * | 4/2015 | Bouhnik et al. | ............ | 600/427 |

* cited by examiner

*Primary Examiner* — Gregory F Cunningham
(74) *Attorney, Agent, or Firm* — Steven Stupp

(57) ABSTRACT

During an analysis technique, the locations of a polyp candidate (and, more generally, a feature) in images of the colon acquired with different orientations of an individual are compared to determine if the polyp candidate is a true positive (an actual polyp) or a false positive (an artifact). In particular, the locations are compared for images when the individual is supine and prone. During this rotation by approximately 180° (and, more generally, a symmetry operation), an actual polyp is expected to also be rotated by approximately 180°. Consequently, the location change during the symmetry operation can be used to validate whether the polyp candidate is an actual polyp. Because the colon is a non-rigid object (with degrees of freedom including rotation, compression and expansion), reference markers (such as haustral folds) are used to assist in determining the location of the polyp candidate in the images acquired in the different orientations.

23 Claims, 7 Drawing Sheets

FEATURE VALIDATION USING ORIENTATION DIFFERENCE VECTOR

BACKGROUND

1. Field

The present disclosure generally relates to computer-based techniques for validating a feature in images. More specifically, the present disclosure relates to a computer-based technique for validating a feature in images based on position changes of the feature for images acquired in different orientations.

2. Related Art

Medical imaging is a widely used approach in medicine for acquiring images of the human body. For example, medical imaging of a patient may involve one or more modalities such as: computed tomography, ultrasound, magnetic resonance imaging, and x-ray imaging. The resulting images are typically evaluated by a physician (such as a radiologist) to diagnose disease and to guide subsequent treatment (e.g., surgical procedures).

However, it can be difficult to interpret medical images. In particular, it is often difficult to distinguish abnormal features from normal anatomical features. Moreover, many of the abnormal features identified during evaluation of medical images are artifacts (or so-called 'false positives') that do not affect the health of the patient.

In addition, it can be challenging to compare medical images that are acquired from different perspectives or when the patient has a different orientation relative to an imaging apparatus to identify abnormal features. For example, many of the organs in the human body are non-rigid and have mechanical degrees of freedom (such as rotation, compression and extension) that allow these organs to change their position and shape in the different orientations. These problems can degrade the accuracy of the evaluations of medical images, resulting in false positives, false negatives (where abnormal features are not identified), unnecessary medical procedures and adverse patient outcomes. Hence, there is a need for an improved analysis technique for evaluating medical images.

SUMMARY

The disclosed embodiments relate to a computer system that validates a feature. During operation, the computer system receives an image of a portion of an individual and a second image of the portion of the individual, where the image corresponds to an orientation of the individual and the second image corresponds to a second orientation of the individual. Then, the computer system determines reference markers in a non-rigid object in the image and second image. Moreover, relative to the reference markers, the computer system identifies a location of a feature in the non-rigid object in the image and a second location of the feature in the non-rigid object in the second image. Next, the computer system calculates a difference vector based on the location and the second location. Furthermore, the computer system determines if the difference vector matches an expected location change based on the orientation and the second orientation. If there is a match, the computer system identifies the feature as a true positive. Otherwise, the computer system identifies the feature as a false positive.

Note that the orientation and the second orientation may correspond to a symmetry operation on the individual. For example, the symmetry operation may include: rotation by an angle about an axis, translation and/or scaling. In particular, the angle may be approximately 180°, and the orientation and the second orientation may include: supine and prone; or prone and supine.

Moreover, the non-rigid object may include: a portion of a small intestine, a portion of a large intestine, a portion of a non-rigid organ, a portion of the vascular system (such as an artery or a vein), and/or a portion of an organ that includes a cavity with a fluid (such as the bladder). For example, the non-rigid object may include the colon, and the reference markers may include haustral folds. Therefore, the feature may include a polyp candidate. More generally, the non-rigid object may have rotation, compression and extension degrees of freedom.

Furthermore, a match may correspond to a sign of the difference vector. Thus, a positive difference vector may be a false positive, while a negative difference vector may be a true positive.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for validating a feature, and a computer-program product (e.g., software) for use with the computer system are described. During this analysis technique, the locations of a polyp candidate (and, more generally, a feature) in images of the colon acquired with different orientations of an individual are compared to determine if the polyp candidate is a true positive (an actual polyp) or a false positive (an artifact or an anomaly). In particular, the locations are compared for images when the individual is supine and prone. During this rotation by approximately 180° (and, more generally, a symmetry operation), an actual polyp is expected to also be rotated by approximately 180°. Consequently, the location change during the symmetry operation can be used to validate whether the polyp candidate is an actual polyp. Because the colon is a non-rigid object (with degrees of freedom including rotation, compression and expansion), reference markers (such as haustral folds) are used to assist in determining the location of the polyp candidate in the images acquired in the different orientations.

By validating whether the feature is a true positive or a false positive, the analysis technique may improve the accuracy of evaluations or interpretations of medical images by healthcare professionals (such as radiologists). In the process, the analysis technique may reduce patient anxiety associated with false positives, and may reduce the cost (including unnecessary medical procedures and/or diagnostic testing) and adverse patient outcomes (including mortality) associated with false negatives.

In the discussion that follows, the medical images are of an individual. More generally, the medical images may be of an animal that is living or deceased. Furthermore, the medical images of the object may be acquired using a wide variety of medical-imaging modalities, including: a computed-tomography or CT scan, histology, an ultrasound image, a magnetic resonance imaging or MRI scan, x-ray imaging, or another type of two-dimensional (2D) image slice depicting volumetric information. As an illustrative example, the object is the colon, and the medical images are acquired using CT scans (e.g., a CT colonography or CT virtual colonoscopy). However, the images may be a variety of organs and aspects of anatomy, as well as a variety of procedures (such as mammography or lung-cancer screening). In general, the object may be a non-rigid object that includes medical degrees of freedom, such as: rotation, compression and extension. Thus, the object may include organs and anatomical features such as: a portion of a small intestine, a portion of a large intestine, a portion of a non-rigid organ, a portion of the vascular system (such as the heart, an artery or a vein), and/or a portion of an organ that includes a cavity with a fluid or a liquid.

Figure 1:
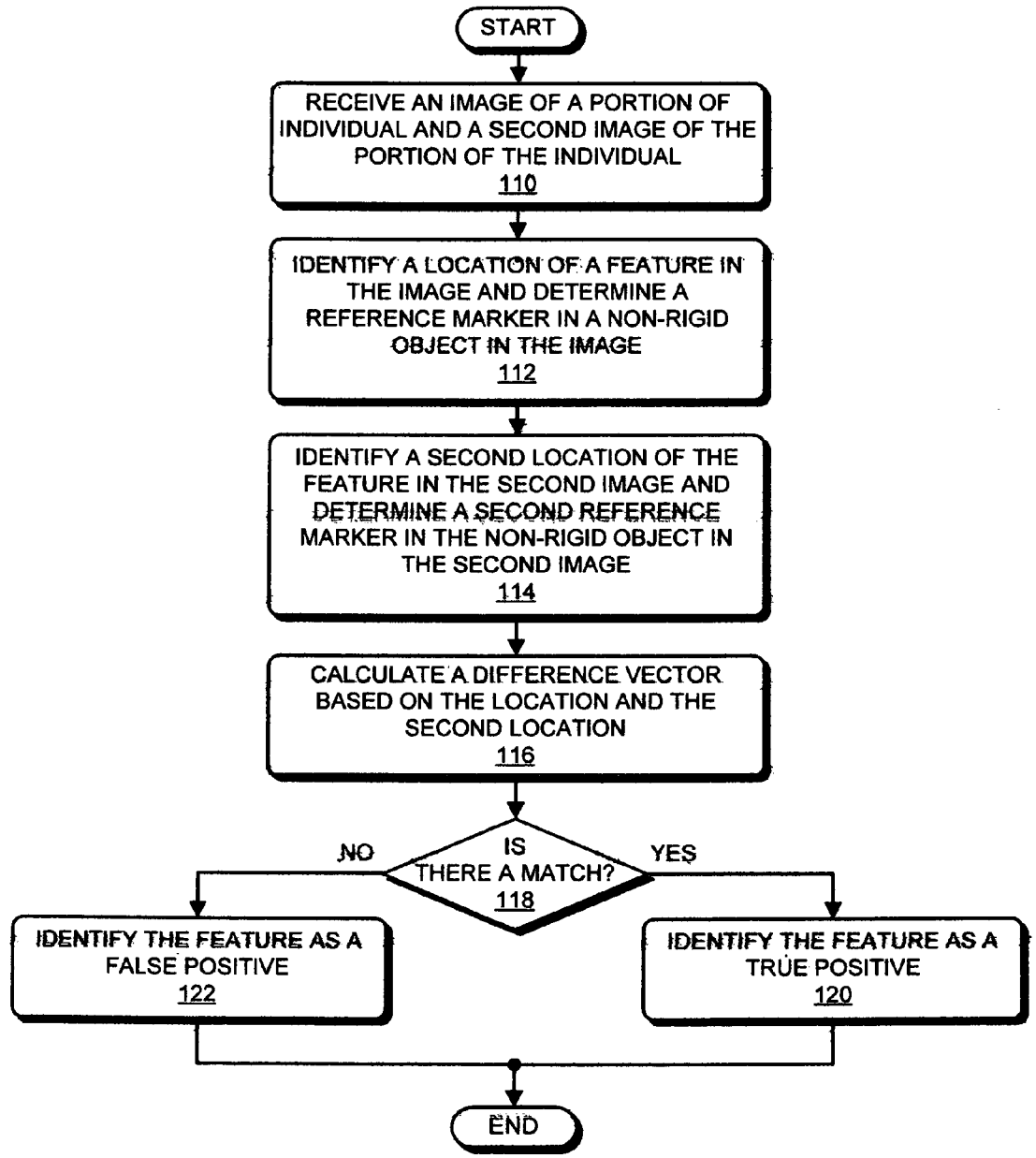
FIG. 1 is a flow chart illustrating a method for validating a feature in accordance with an embodiment of the present disclosure.

We now describe embodiments of the analysis technique. FIG. 1 presents a flow chart illustrating a method 100 for validating a feature, which may be performed by a computer system (such as computer system 600 in FIG. 6). During operation, the computer system receives (or accesses in a computer-readable memory) an image of a portion of an individual and a second image of the portion of the individual (operation 110), where the image corresponds to an orientation of the individual and the second image corresponds to a second orientation of the individual. In an exemplary embodiment, the image and the second image include representations of human anatomy, such as input data that is compatible with a Digital Imaging and Communications in Medicine (DICOM) standard. Note that the orientation and the second orientation may correspond to a symmetry operation on the individual. For example, the symmetry operation may include: rotation by an angle about an axis, translation and scaling. In particular, the angle may be approximately 180°, and the orientation and the second orientation may include: supine and prone; or prone and supine. Thus, the image may be acquired when the individual is supine and the second image may be acquired when the individual is prone (or vice versa). However, in other embodiments, such as rotational angiography, other rotation angles may be used, such as: 5°, 45°, 90°, 270°, etc. In general, the rotation angle may be an arbitrary, known angle. In some embodiments, the orientation and/or the second orientation include at least one of right lateral decubitus position and left lateral decubitus position. For example, the individual may be lying on their right or left side. Relative to supine or prone, in this position the rotation angle is 90°. In a complicated imaging case (such as certain virtual colonoscopies), an image with the individual in a lateral decubitus position is used in the analysis technique in conjunction with a supine image and/or a prone image (i.e., two or more images may be used).

Then, the computer system identifies a location of a feature in the image and determines a reference marker in (or proximate to) a non-rigid object in the image (operation 112). Moreover, the non-rigid object may include: a portion of a small intestine, a portion of a large intestine, a portion of a non-rigid organ, a portion of the vascular system (such as an artery or a vein), and/or a portion of an organ that includes a cavity with a fluid. For example, the non-rigid object may include the colon, and the reference markers may include haustral folds. Therefore, the feature may include a polyp candidate. More generally, the non-rigid object may have rotation, compression and extension degrees of freedom. As described further below with reference to FIG. 3, if the feature is an actual polyp it is attached to the colon wall and it will rotate with the individual when the orientation is changed.

Moreover, the computer system identifies a second location of the second feature in the second image and determines a second reference marker in (or proximate to) the non-rigid object in the second image (operation 114). Note that the computer system may identify the location and the second location relative to the reference marker and the second reference marker. For example, the haustral folds (or folds of mucosa within the colon) may be used to define a polynomial that represents a reference plane (there may be separate reference planes defined or specified for the image and the second image). This reference plane may be used to determine the locations of the feature in a given image, even if the dimension or shape of the object has changed when the orientation of the individual changed.

Next, the computer system calculates a difference vector based on the location and the second location (operation 116). For example, the difference vector may be calculated as the vector or three-dimensional (3D) Euclidean difference of the location and the second location. However, because the image and the second image may be 2D slices of the object or the individual, in some embodiments the difference vector is calculated as the 2D difference of the location and the second location. Note that the 2D difference may be more prone to errors in the presence of compression or extension.

Furthermore, the computer system determines if the difference vector matches (operation 118) an expected location change based on the orientation and the second orientation. If there is a match (operation 118), the computer system identifies the feature as a true positive (operation 120). Otherwise (operation 118), the computer system identifies the feature as a false positive (operation 122).

For example, a match may correspond to a sign of the difference vector. Thus, a positive difference vector may be a false positive, while a negative difference vector may be a true positive. As noted above, if the feature is an actual polyp it is attached to the colon wall. Consequently, when the orientation is changed, the location of the features changes. Therefore, the sign of the difference vector may change. In contrast, the location of an artifact may be unchanged when the orientation is changed.

Figure 2:
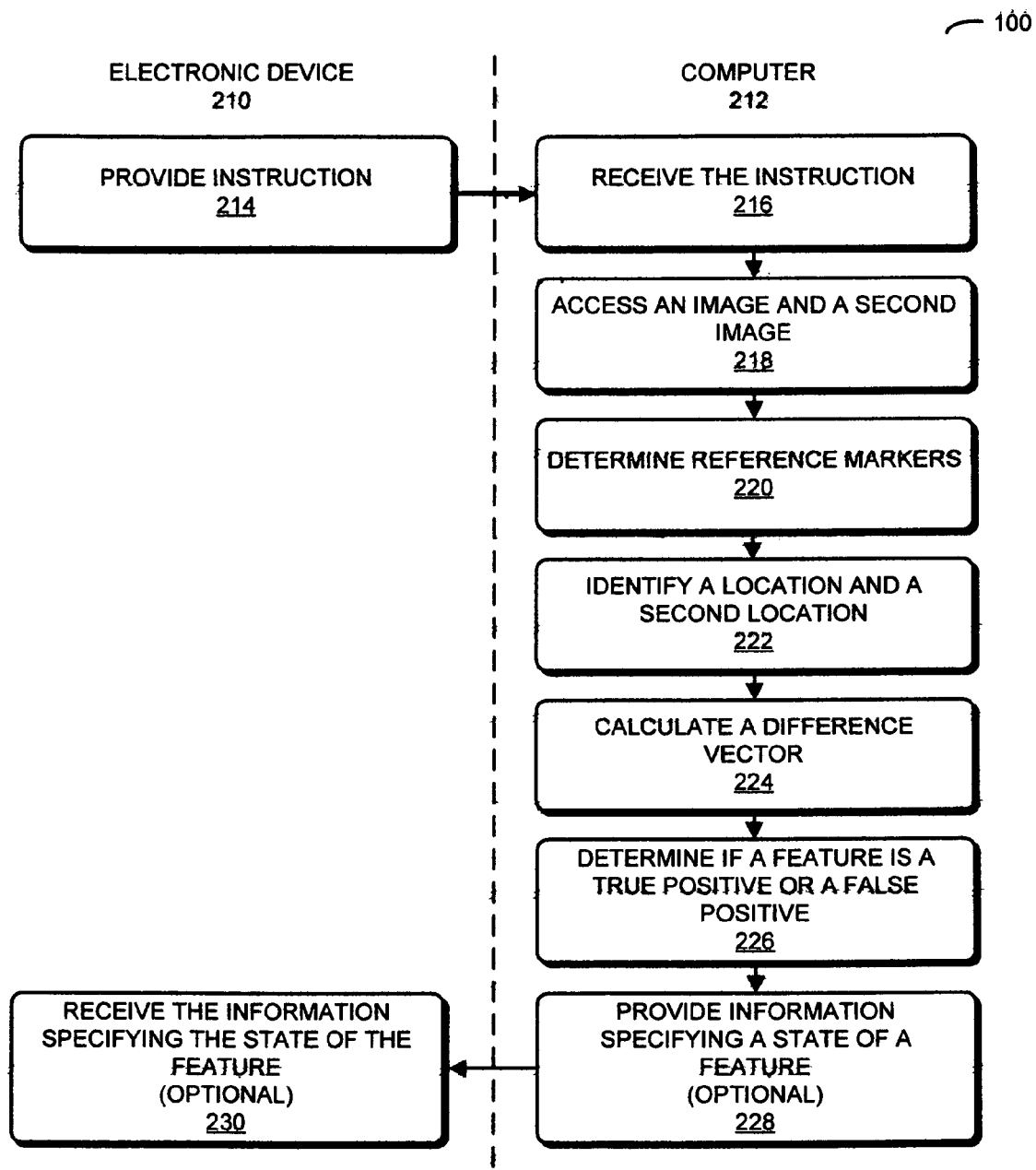
FIG. 2 is a flow chart illustrating the method of FIG. 1 in accordance with an embodiment of the present disclosure.

In an exemplary embodiment, the analysis technique is implemented using one or more electronic devices (such as a computer or a portable electronic device, e.g., a cellular telephone) and one or more computers (such as a server or a computer system), which communicate through a network, such as a cellular-telephone network and/or the Internet. This is illustrated in FIG. 2, which presents a flow chart illustrating method 100 (FIG. 1).

During the method, a user of an electronic device 210 may provide (operation 214) an instruction or a command to access the image and the second image. (Alternatively, electronic device 210 may provide the image and the second image.) After receiving the instruction (operation 216), computer 212 may access the image and the second image (operation 218), for example, in a computer-readable memory (such as data structure).

Moreover, computer 212 may determine reference markers (operation 220) in or proximate to the non-rigid object in the image and second image.

Furthermore, relative to the reference markers, computer 212 may identify the location and the second location (operation 222). Next, computer 212 may calculate a difference vector (operation 224) based on the location and the second location.

Additionally, computer 212 may determine if a feature is a true positive or a false positive (operation 226). For example, if the difference vector matches an expected location change based on the orientation and the second orientation, the feature may be a true positive. Otherwise, the feature may be a false positive.

In some embodiments, computer 212 optionally provides (operation 228) and electronic device 210 optionally receives (operation 230) information specifying a state of the feature (i.e., true positive or false positive).

In some embodiments of method 100 (FIGS. 1 and 2), there are additional or fewer operations. Moreover, the order of the operations may be changed, and/or two or more operations may be combined into a single operation.

For example, in some embodiments the computer system may receive (instead of determining) information that specifies the reference markers and/or may receive information that specifies the feature, as well as the location and the second location. At least some of this information may have been computed previously and/or may be provided by an expert (such as a physician or a radiologist).

Alternatively, the computer system may identify the feature. This may involve: a digital subtraction bowel cleansing (DSBC) technique that identifies CT image pixels as air, contrast material, or pixels at the boundary of air and the contrast material; noise filtering, such as adaptive statistical iterative reconstruction (ASIR); and/or segmenting the object along the length of the colon (e.g., the rectum, the sigmoid, the descending colon, the transverse colon, the ascending colon and the cecum) and/or along the cross-section (e.g., the lumen-mucosa edge). In addition, when identifying the feature the computer system may: use a primary navigation technique that facilitates polyp search via a 3D view of colon segments with a cut plane; detailed polyp evaluation using established criteria to identify polyp candidates that are likely to be true polyps; and a problem-solving virtual instrument (such as a software technique) that provides a combined 2D and a 3D view to reduce false-positive readings (i.e., to correctly identify true polyps) by assessing tissue-density homogeneity with polyp morphologic features. This last operation may include the analysis technique. Note that typical characteristics of a true polyp may include: a spherical or hemispherical morphology; smooth borders without angulation; and fixed position for sessile polyps and flat lesions. Polyps may also be correlated with homogeneous soft-tissue density in a 2D image cross-section when viewed using the problem-solving virtual instrument.

In some embodiments, determining whether the feature is a true positive or a false positive is based, at least in part, on prior analysis of features in images of multiple individuals. For example, prior analysis results on individuals that are similar to the individual (such as individuals with similar anatomy or anatomical features and landmarks or reference markers) may be used.

Figure 3:
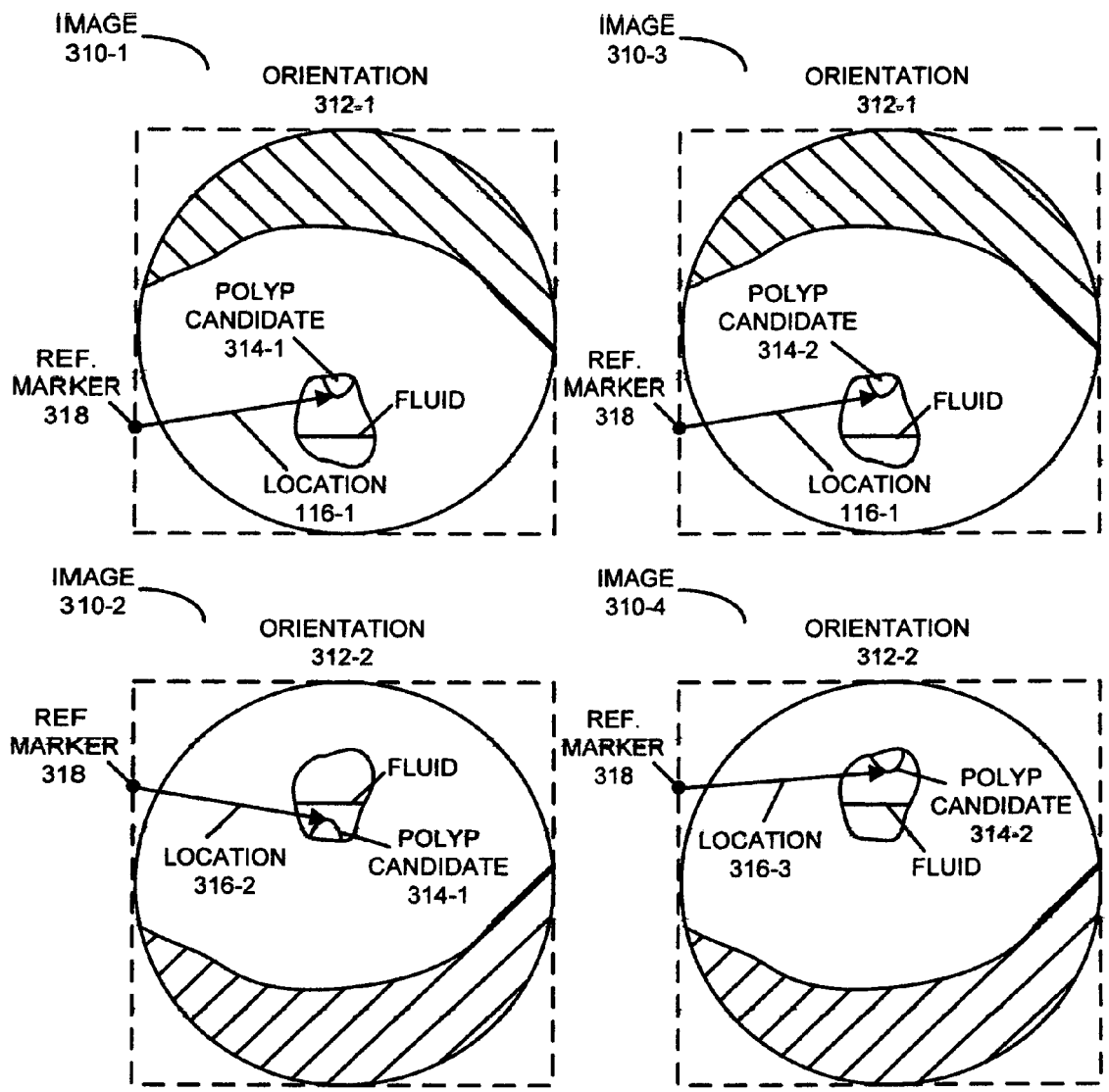
FIG. 3 is a drawing of medical images acquired in different orientations of an individual in accordance with an embodiment of the present disclosure.

As described previously, in an exemplary embodiment the analysis technique may allow potential polyps in the colon to be validating as either false positives or true positives. In particular, as shown in FIG. 3, which presents a drawing of medical images 310 acquired in different orientations 312 of an individual, locations 316 (relative to a reference marker 318) of polyp candidates 314 in the colon may or may not change with orientations 312. These location changes can be used to determine whether polyp candidates 314 are actual polyps (true positives) or not (false positives).

For example, as shown in FIG. 3, for polyp candidate 314-1 the difference vector changes sign when the individual changes from supine to prone (or vice versa) because polyp candidate 314-1 is attached to the colon wall. Consequently, polyp candidate 314-1 is (or is more likely to be) an actual polyp.

In contrast, for polyp candidate 314-2 the difference vector does not change sign when the individual changes from supine to prone (or vice versa) because polyp candidate 314-2 is not attached to the colon wall. Consequently, polyp candidate 314-2 is (or is more likely to be) an artifact or a false positive (such as residue stool or other artifacts).

In an exemplary embodiment, one or more features can be identified by a user of the computer system using so-called True 3D (which combines stereoscopic images having motion parallax with prehension associated with interaction of the user with the stereoscopic images using an interaction tool or one or more fingers) and/or computer-assisted detection (CAD). CAD systems usually automatically flag potential polyp candidates (or potential features) using shape filters. CAD has the potential to decrease interpretation time, improve sensitivity and specificity and reduce inter-reader variability. Moreover, CAD analysis techniques flag potential polyp candidates by searching through the colon lumen and evaluating if a particular part of the wall is shaped like a polyp (e.g., geometric features) and if its neighboring tissue is smooth (e.g., texture features). In general, CAD systems typically offer a trade-off: high sensitivity (over 90% for polyps 10 mm or larger) is associated with more false positives (6 or more per patient), which can then increase interpretation times.

However, CAD systems often generate too many false positives when identifying all true-positive features. Therefore, CAD findings usually are reviewed in order to discard false positives. Furthermore, reference markers are typically better identified using True 3D. This is because rotation, compression and extension usually significantly change the reference anatomy, which makes CAD unreliable. In particular, the reference structures do not necessarily maintain the same shape/form.

Combining True 3D and CAD may improve true-positive and false-positive discrimination. Computed tomographic colonoscopy (CTC) with CAD is often associated with high false-positive rates. This leaves readers (such as the user of the computer system, e.g., a radiologist) the hard task of visually mapping 2D and 3D views to discriminate true from false-positives. True 3D combined with CAD may reduce true-positive and false-positive discrimination times because this problem-solving approach may enable the assessment of lesion tissue-density homogeneity with polyp morphologic features in a combined 2D-3D view. Furthermore, controlling CAD polyp candidates with a hand-directed interaction tool (such as a stylus) allows the reader to offload spatial cognition to their perceptual motor system, instead of performing a mental rotation or an imagined perspective shift, which can reduce the intensity of CTC interpretation.

Note that True 3D may offer improved anatomic understanding and reference-marker identification. Many current CTC visualization techniques have limitations in representing the complex 3D relationships present in the colon, a key factor in facilitating polyp detection. In order to successfully identify a polyp, a radiologist usually needs to integrate a series of 2D images in their mind and then cognitively extract the relevant 3D relationships that define the colon, neighboring anatomy and polyps. In complex cases, they must visually map two or more views of the same data to find appropriate correspondences of one view with another view to produce a match and determine if what they see is a true polyp. Using True 3D may enable immediate colon lumen identification as open tissue segments with no distortion that maintain true 3D relationships. Furthermore, True 3D may provide a better understanding of anatomical shapes because it integrates all three dimensions and corresponding depth cues in a single view.

True 3D may also provide increased polyp sensitivity. Reader perceptual error is one of the most common reasons for false negatives. Ideally, polyps are visible as abnormal structures that protrude the colon wall. When polyps are less conspicuous, radiologists report that: polyps appear flat; polyp edges are not prominent (i.e., are not well defined); polyps are difficult to distinguish from a normal fold; polyps look like noise or a normal bump on the colonic surface; and/or that polyp looks like stool. In many cases, polyp height is one of the major determinants of visual conspicuity.

Because the visual features that define a polyp (shape, size, height and edges) can be magnified as a function of image perspective and image parallax, viewing polyp images with True 3D is often better than analyzing monoscopic 3D-rendered images. In particular, strong image parallax typically enhances the visual elevation of polyps, the visual prominence of edges in colon structures and improves the contextual features of colon folds.

Furthermore, True 3D may also increase reader tolerance to image noise. Low-dose CTC imaging techniques are now standard of care. However, overall image quality is reduced as the radiation dose decreases (because of lower soft-tissue contrast and higher image noise). In particular, in 3D endoluminal images, artifacts such as mucosal nodularity and endoluminal floaters become more prominent. Using techniques such as adaptive statistical iterative reconstruction (ASIR) allows a significant noise reduction in low-dose images, but imaging artifacts may persist (although less conspicuously) in 3D reconstructions.

Viewing low-dose polyp images with True 3D may reduce or eliminate these imaging artifacts because it enables readers to see through clutter in the foreground or background, and makes it possible to focus at different depth levels, potentially increasing reader's tolerance to image noise in low-dose CTC. For example, random dot stereograms are more easily viewed using True 3D, because size, density, speed and direction are easily determined when viewed in True 3D.

Figure 4:
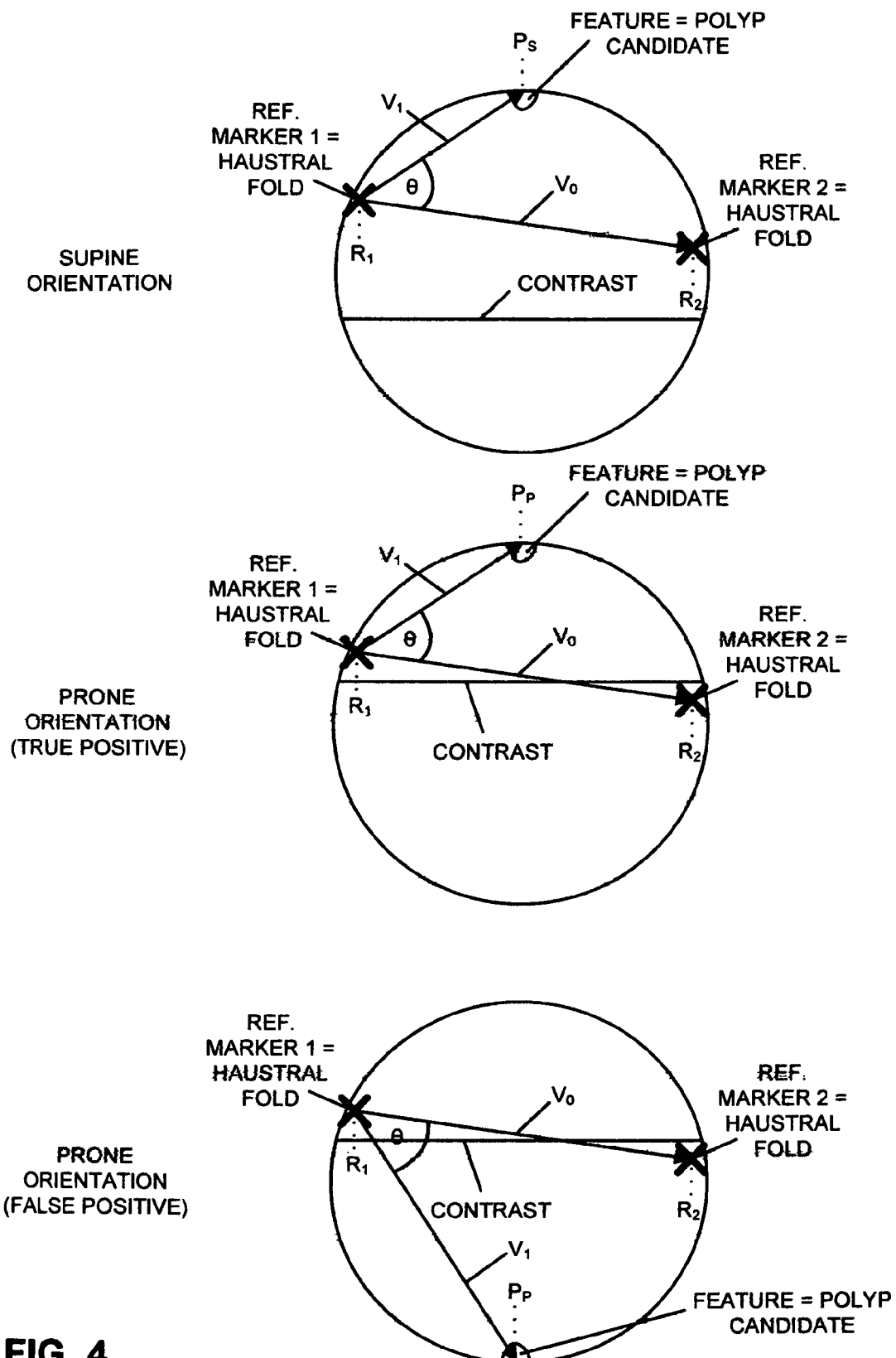
FIG. 4 is a drawing illustrating analysis of medical images acquired in different orientations of an individual in accordance with an embodiment of the present disclosure.

We now describe an illustration of the calculations used in the analysis technique. FIG. 4 presents a drawing illustrating analysis of medical images acquired in different orientations of an individual. For clarity, only a portion of the images are shown.

In the analysis technique, the feature (in this case a potential polyp) has a location $P_s$ in the supine image and a location $P_p$ in the prone image. In addition, based on the location $R_1$ of reference marker 1 and the location $R_2$ of reference marker 2, vectors $V_0(R_2-R_1)$ and $V_1(P_s-R_1$ or $P_p-R_1)$ are defined. These vectors are separated by rotation angle θ. Note that $R_1$ can be at the origin (0, 0, 0).

The delta or difference vector may be defined as the difference between two quaternion rotations specified by two reference markers and a feature. Note that a Quaternion $\vec{q}$ is an array containing a vector $\vec{v}$ and a scalar w. The scalar value is the rotation angle θ in radians and the vector is the unit vector about which the rotation takes place. Thus, $$\vec{q} = \langle \vec{v}, w \rangle,$$

where w equals $q_3$ and $$\vec{v} = [q_0, q_1, q_2] = [x, y, z].$$

A quaternion can represent a rotation by a rotation angle θ around a unit axis a. Note that if a has unit length, then $\vec{q}$ has unit length too. Thus, $$\vec{q} = \left[ a_x \sin\left(\frac{\theta}{2}\right), a_y \sin\left(\frac{\theta}{2}\right), a_z \sin\left(\frac{\theta}{2}\right), \cos\left(\frac{\theta}{2}\right) \right]$$

or $$\vec{q} = \left[ \vec{a} \sin\left(\frac{\theta}{2}\right), \cos\left(\frac{\theta}{2}\right) \right].$$

Given normalized vectors $V_0$ and $V_1$, $\vec{q}$ equals $$V_0 V_1^* = [V_0 \times V_1, V_0 \cdot V_1]$$
$$= \left[ \hat{V} \sin\left(\frac{\theta}{2}\right), \cos\left(\frac{\theta}{2}\right) \right],$$

where $$\hat{V} = \frac{V_0 \times V_1}{\|V_0 \times V_1\|},$$

$$V_0 \cdot V_1 = \cos\left(\frac{\theta}{2}\right)$$
$$= W,$$

and $$\vec{q}^* = [-V, W].$$

Furthermore, given the quaternion for the supine view $\vec{q}_s$ and the quaternion for the prone view $\vec{q}_p$, the delta vector $\vec{qd}$ may be defined as $\vec{q}_p - \vec{q}_s$ or $$[x_p-x_s, y_p-y_s, z_p-z_s, W_p-W_s].$$

With this background and definition in mind, if $R_1$ is at the origin $\vec{q}_s$ or $\vec{q}_p$ can be expressed as $$\left[ (x, y, z) \sin\left(\frac{\theta}{2}\right), W \right].$$

In an exemplary embodiment, in the supine orientation $R_1=(0, 0, 0)$, $R_2=(-2, 2, 0)$ and $P_s=(0, 1, 0)$. Moreover, in the prone (true-positive) orientation $R_1=(0, 0, 0)$, $R_2=(-2, 2, 0)$ and $P_s=(-1, 1, 0)$. Furthermore, in the prone (false-positive)

orientation $R_1=(0, 0, 0)$, $R_2=(-2, 2, 0)$ and $P_s=(-1, -2, 0)$. Then, $\vec{q}_s=[0, 0, -0.35, 0.93]$, for the true positive $\vec{q}_p=[0, 0, 0.009, 0.99]$, for the false positive $\vec{q}_{px}=[0, 0, 0.79, 0.605]$, $\vec{q}_p-\vec{q}_s=[0, 0, 0.35, 0.06]$ and $\vec{q}_{px}-\vec{q}_{sx}=[0, 0, 1.14, -0.33]$. In the case of $\vec{qd}$, the unit vectors are aligned in plane and there is a minimum rotation angle. In contrast, in the case of $\vec{qd}_x$, the unit vectors are not aligned (they and y components compensate a large difference in z) and there is a large rotation angle.

In summary, two quaternions can be used to register anatomical features and determine movement. One of the features can be the origin (0, 0, 0). The quaternion description may indicate rotation, compression and expansion (through the unit vector), which may allow for an improved description of location and orientation of a feature in two images. True-positive features may have small differences between quaternions unit-vector orientation and rotation angle (such as less than 45°). In contrast, false-positive features may have large variation in both unit-vector orientation and rotation angle (such as 45° approaching 90°).

Figure 5:
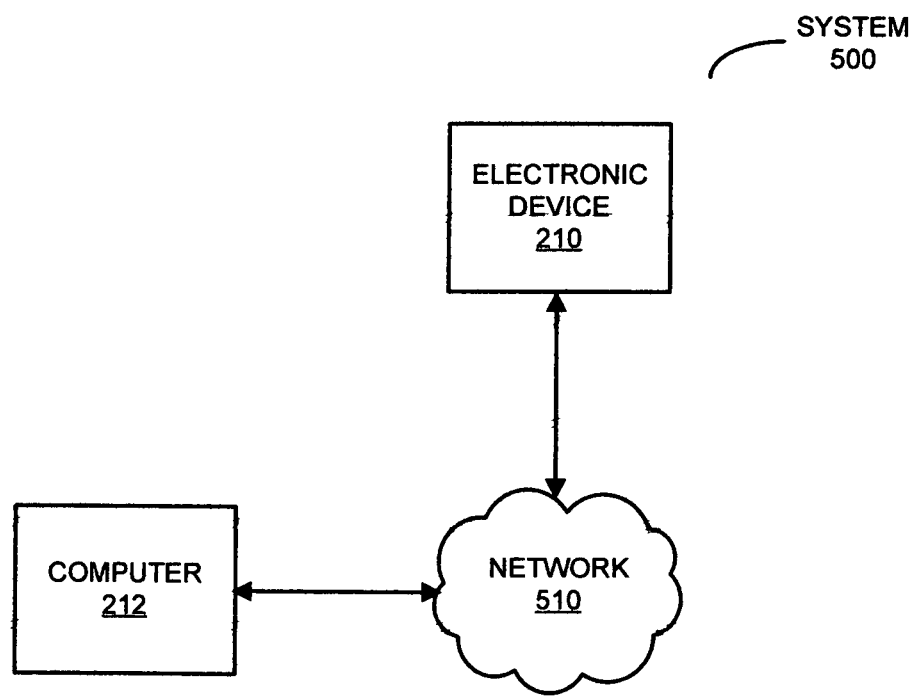
FIG. 5 is a block diagram illustrating a system that performs the method of FIGS. 1 and 2 in accordance with an embodiment of the present disclosure.

We now describe embodiments of a system and the computer system, and their use. FIG. 5 presents a block diagram illustrating a system 500 that can be used, in part, to perform operations in method 100 (FIGS. 1 and 2). In this system, during the analysis technique electronic device 210 may use a software product, such as a software application that is resident on and that executes on electronic device 210. (Alternatively, the user may interact with a web page that is provided by computer 212 via network 510, and which is rendered by a web browser on electronic device 210. For example, at least a portion of the software application may be an application tool that is embedded in the web page, and which executes in a virtual environment of the web browser. Thus, the application tool may be provided to electronic device 210 via a client-server architecture.) This software application may be a standalone application or a portion of another application that is resident on and which executes on electronic device 210 (such as a software application that is provided by computer 212 or that is installed and which executes on electronic device 210). In an exemplary embodiment, the software product may be medical-imaging software, such as software used by radiologists.

During the analysis technique, the user of electronic device 210 (such as a physician or a radiologist) may provide, via network 510, an instruction or a command to access the image and the second image. (Alternatively, electronic device 210 may provide, via network 510, the image and the second image.) After receiving the instruction, computer 212 may access the image and the second image, for example, in a computer-readable memory (such as data structure).

Moreover, computer 212 may determine reference markers in or proximate to the non-rigid object in the image and second image.

Furthermore, relative to the reference markers, computer 212 may identify the location and the second location. Next, computer 212 may calculate a difference vector based on the location and the second location.

Additionally, computer 212 may determine if the difference vector matches an expected location change based on the orientation and the second orientation. If there is a match, computer 212 identifies the feature as a true positive. Otherwise, computer 212 identifies the feature as a false positive.

After performing the analysis, computer 212 may provide, via network 510, a list of actual polyps (and/or artifacts) to electronic device 210. This list may be presented to the user on a display of electronic device 210. In some embodiments, the actual polyps (and/or the artifacts) are presented in context, for example, in 2D or 3D images of the individual (such as a patient).

Note that information in system 500 may be stored at one or more locations in system 500 (i.e., locally or remotely). Moreover, because this data may be sensitive in nature, it may be encrypted. For example, stored data and/or data communicated via network 510 may be encrypted.

Figure 6:
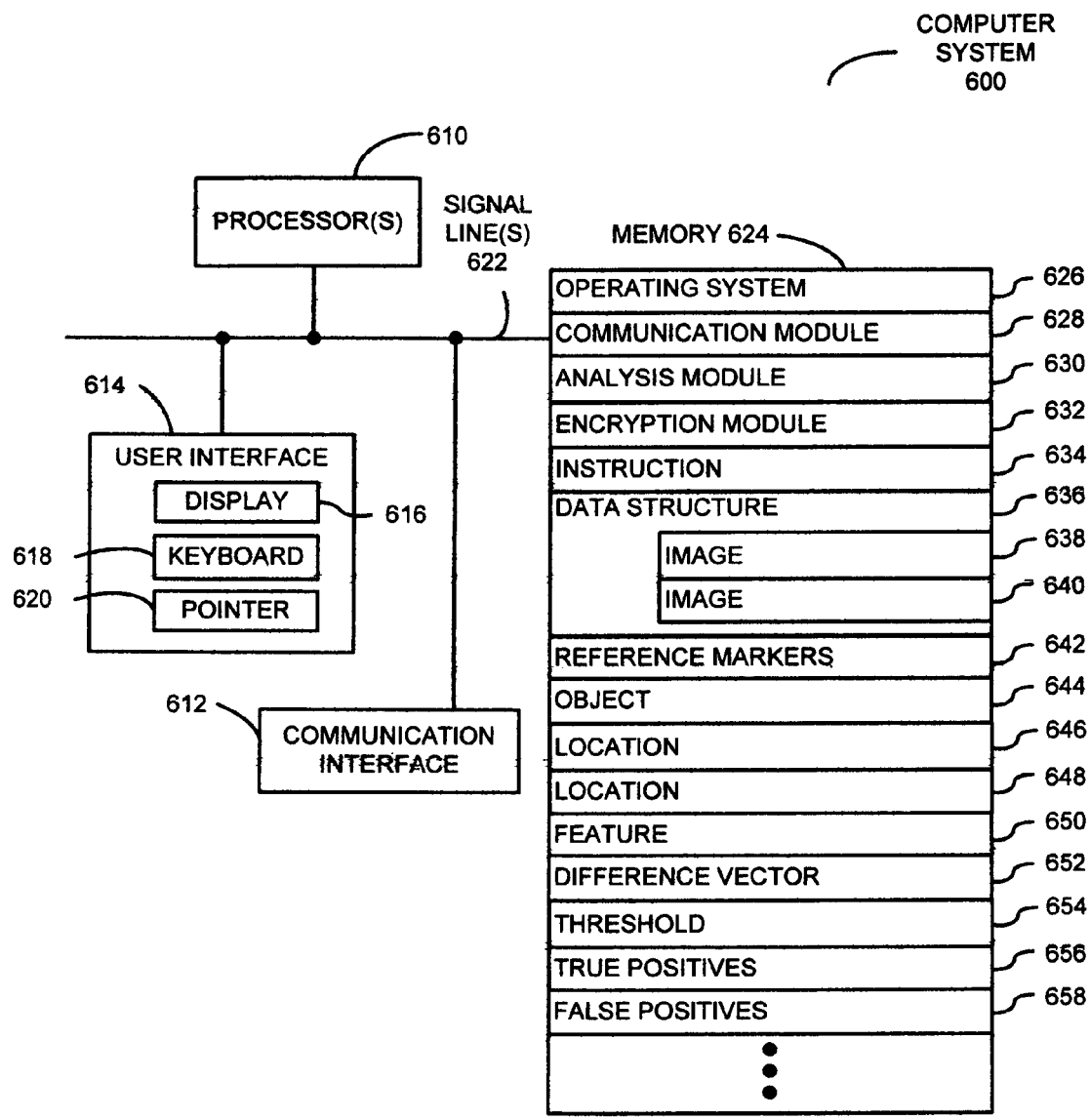
FIG. 6 is a block diagram illustrating a computer system that performs the method of FIGS. 1 and 2 in accordance with an embodiment of the present disclosure.

FIG. 6 presents a block diagram illustrating a computer system 600 that performs methods 100 (FIGS. 1 and 2). Computer system 600 includes one or more processing units or processors 610, a communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store procedures (or a set of instructions) in a communication module 628. These communication procedures may be used for communicating with one or more computers and/or servers, including computers and/or servers that are remotely located with respect to computer system 600.

Memory 624 may also include multiple program modules (or sets of instructions), including: analysis module 630 (or a set of instructions), and/or encryption module 632 (or a set of instructions). Note that one or more of these program modules (or sets of instructions) may constitute a computer-program mechanism.

Figure 7:
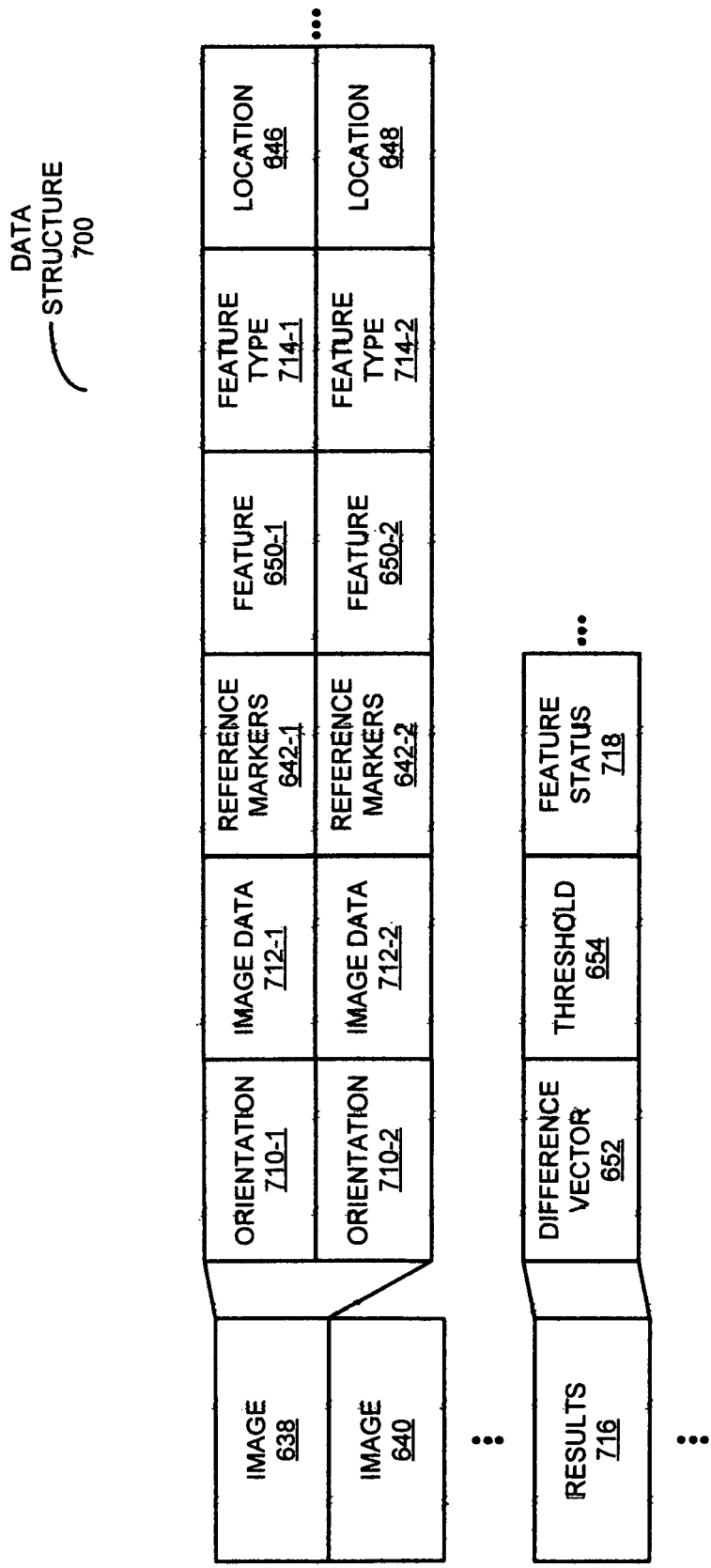
FIG. 7 is a block diagram illustrating a data structure that includes image data in accordance with an embodiment of the present disclosure.

During the analysis technique, analysis module 630 may receive from a user of electronic device 210 (FIGS. 2 and 4), via communication interface 612 and communication module 628, an instruction 634 (or a command) to access images 638 and 640 in data structure 636. (Alternatively, images 638 and 640 may be provided via communication interface 612 and communication module 628.) As shown in FIG. 7, which presents a block diagram illustrating data structure 700 that includes image data 712, images 638 and 640 may be associated with orientations 710. Moreover, entries in data structure 700 for images 638 and 640 may include: reference markers 642, feature 650, feature types 714 (such as polyps) and locations 646 and 648. As described further below, by comparing the data for images 638 and 640 in data structure 700, analysis module 630 may calculate results 716, such as difference vector 652. Moreover, by comparing difference vector 652 to threshold 654, analysis module 630 may determine feature status 718 (such as one of true positives 656 or one of false positives 658 in FIG. 6).

Referring back to FIG. 6, in response to instruction 634, analysis module 630 may access images 638 and 640 in data structure 636. Then, analysis module 630 may determine reference markers 642 in or proximate to non-rigid object 644 in images 638 and 640.

Moreover, relative to reference markers 642, analysis module 630 may identify a location 646 of feature 650 in image 638 and a location 648 of feature 650 in image 640. Next, analysis module 630 may calculate a difference vector 652 based on locations 646 and 648.

Furthermore, analysis module 630 may determine if difference vector 652 matches an expected location change based on orientations 710 (FIG. 7). For example, analysis module 630 may compare difference vector 652 to a threshold 654 (such as zero). If there is a match, analysis module 630 identifies feature 650 as one of true positives 656. Otherwise, analysis module 630 identifies feature 650 as one of false positives 658.

After performing the analysis, analysis module 630 may provide, via communication module 628 and communication interface 612, true positives 656 and/or false positives 658, for example, to a user of electronic device 210 (FIGS. 2 and 4).

Because information used in the analysis technique may be sensitive in nature, in some embodiments at least some of the data stored in memory 624 and/or at least some of the data communicated using communication module 628 is encrypted or decrypted using encryption module 632.

Instructions in the various modules in memory 624 may be implemented in: a high-level procedural language, an object-oriented programming language, and/or in an assembly or machine language. Note that the programming language may be compiled or interpreted, e.g., configurable or configured, to be executed by the one or more processors 610.

Although computer system 600 is illustrated as having a number of discrete items, FIG. 6 is intended to be a functional description of the various features that may be present in computer system 600 rather than a structural schematic of the embodiments described herein. In some embodiments, some or all of the functionality of computer system 600 may be implemented in one or more application-specific integrated circuits (ASICs) and/or one or more digital signal processors (DSPs).

Computer system 600, as well as electronic devices, computers and servers in system 600, may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, and/or a client computer (in a client-server architecture). Moreover, network 510 (FIG. 5) may include: the Internet, World Wide Web (WWW), an intranet, a cellular-telephone network, LAN, WAN, MAN, or a combination of networks, or other technology enabling communication between computing systems.

Electronic device 210 (FIGS. 2 and 4), computer 212 (FIGS. 2 and 4), system 500 (FIG. 5), computer system 600 and/or data structure 700 (FIG. 7) may include fewer components or additional components. Moreover, two or more components may be combined into a single component, and/or a position of one or more components may be changed. In some embodiments, the functionality of electronic device 210 (FIGS. 2 and 4), computer 212 (FIGS. 2 and 4), system 500 (FIG. 5), computer system 600 and/or data structure 700 (FIG. 7) may be implemented more in hardware and less in software, or less in hardware and more in software, as is known in the art.

While the preceding embodiments illustrated the use of the analysis technique with medical images, in other embodiments the analysis technique is used with images in other types of applications, including non-medical applications. Consequently, in these other embodiments, the image and the second image may be of objects other than an individual or an animal, including inanimate objects, materials, products, etc.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for validating a feature, the method comprising:
receiving an image of a portion of an individual and a second image of the portion of the individual, wherein the image corresponds to an orientation of the individual and the second image corresponds to a second orientation of the individual, and wherein an angular difference between the orientation and the second orientation is approximately one of: 90°, and 180°;
determining reference markers in a non-rigid object in the image and second image;
using the computer, identifying, relative to the reference markers, a location of a feature in the non-rigid object in the image and a second location of the feature in the non-rigid object in the second image;
calculating a difference vector based on the location and the second location;
determining if the difference vector matches an expected location change based on the orientation and the second orientation, wherein the expected location change includes the difference vector having a magnitude that is less than a predefined value;
if there is a match, identifying the object as a true positive; and
otherwise, annotating the object as a false positive.

2. The method of claim 1, wherein the orientation and the second orientation correspond to a symmetry operation on the individual.

3. The method of claim 2, wherein the symmetry operation includes one of rotation by an angle about an axis, translation and scaling.

4. The method of claim 3, wherein the angle includes approximately 180°; and
wherein the orientation and the second orientation include one of: supine and prone; and prone and supine.

5. The method of claim 1, wherein the non-rigid object includes one of: a portion of a small intestine, a portion of a large intestine, a portion of a non-rigid organ, a portion of the vascular system, and a portion of an organ that includes a cavity with a fluid.

6. The method of claim 1, wherein the non-rigid object includes the colon; and
wherein the reference markers include haustral folds.

7. The method of claim 1, wherein the feature includes a polyp candidate.

8. The method of claim 1, wherein the non-rigid object has rotation, compression and extension degrees of freedom.

9. The method of claim 1, wherein a match corresponds to a sign of the difference vector.

10. A computer-program product for use in conjunction with a computer system, the computer-program product comprising a non-transitory computer-readable storage medium and a computer-program mechanism embedded therein to validate a feature, the computer-program mechanism including:
   instructions for receiving an image of a portion of an individual and a second image of the portion of the individual, wherein the image corresponds to an orientation of the individual and the second image corresponds to a second orientation of the individual, and wherein an angular difference between the orientation and the second orientation is approximately one of: 90°, and 180°;
   instructions for determining reference markers in a no object in the image and second image;
   instructions for identifying, relative to the reference markers, a location of a feature in the non-rigid object in the image and a second location of the feature in the non-rigid object in the second image;
   instructions for calculating a difference vector based on the location and the second location;
   instructions for determining if the difference vector matches an expected location change based on the orientation and the second orientation, wherein the expected location change includes the difference vector having a magnitude that is less than a predefined value;
   if there is a match, instructions for identifying the object as a true positive; and
   otherwise, instructions for identifying the object as a false positive.

11. The computer-program product of claim 10, wherein the orientation and the second orientation correspond to a symmetry operation on the individual.

12. The computer-program product of claim 11, wherein the symmetry operation includes one of rotation by an angle about an axis, translation and scaling.

13. The computer-program product of claim 12, wherein the angle includes approximately 180°, and
   wherein the orientation and the second orientation include one of: supine and prone; and prone and supine.

14. The computer-program product of claim 10, wherein the non-rigid object includes one of a portion of a small intestine, a portion of a large intestine, a portion of a non-rigid organ, a portion of the vascular system, and a portion of an organ that includes a cavity with a fluid.

15. The computer-program product of claim 10, wherein the non-rigid object includes the colon; and
   wherein the reference markers include haustral folds.

16. The computer-program product of claim 10, wherein the feature includes a polyp candidate.

17. The computer-program product of claim 10, wherein the non-rigid object has rotation, compression and extension degrees of freedom.

18. The computer-program product of claim 10, wherein a match corresponds to a sign of the difference vector.

19. A computer system, comprising:
   a processor;
   memory; and
   a program module, wherein the program module is stored in the memory and that during operation is executed by the processor to validate a feature, the program module including:
      instructions for receiving an image of a portion of an individual and a second image of the portion of the individual, wherein the image corresponds to an orientation of the individual and the second image corresponds to a second orientation of the individual, and wherein an angular difference between the orientation and the second orientation is approximately one of 90°, and 180°;
      instructions for determining reference markers in a non-rigid object in the image and second image;
      instructions for identifying, relative to the reference markers, a location of a feature in the non-rigid object in the image and a second location of the feature in the non-rigid object in the second image;
      instructions for calculating a difference vector based on the location and the second location;
      instructions for determining if the difference vector matches an expected location change based on the orientation and the second orientation, wherein the expected location change includes the difference vector having a magnitude that is less than a predefined value;
      if there is a match, instructions for identifying the object as a true positive; and
      otherwise, instructions for identifying the object as a false positive.

20. The computer system of claim 19, wherein the orientation and the second orientation correspond to a symmetry operation on the individual; and
   wherein the symmetry operation includes one of rotation by an angle about an axis, translation and scaling.

21. The method of claim 1, wherein, prior to determining the reference markers, the method further comprises rotating one of the image and the second image so that the image and the second image have a common orientation.

22. The computer-program product of claim 10, wherein the computer-program mechanism further comprises, prior to the instructions for determining the reference markers, instructions for rotating one of the image and the second image so that the image and the second image have a common orientation.

23. The computer system of claim 19, wherein the program module further comprises, prior to the instructions for determining the reference markers, instructions for rotating one of the image and the second image so that the mage and the second image have a common orientation.

* * * * *